United States Patent
Cannon et al.

[19]

[11] Patent Number: 6,104,582
[45] Date of Patent: Aug. 15, 2000

[54] STORM ALERT AUTOMATIC SYSTEM POWER-DOWN

[75] Inventors: Joseph M. Cannon, Harleysville; James A. Johanson, Macungie, both of Pa.

[73] Assignee: Lucent Technologies, Inc., Murray Hill, N.J.

[21] Appl. No.: 09/245,076

[22] Filed: Feb. 2, 1999

[51] Int. Cl.⁷ .................................................. H02H 3/22
[52] U.S. Cl. .............................. 361/1; 361/111; 361/118; 361/119
[58] Field of Search ............................... 361/1, 111, 118, 361/119

[56] References Cited

U.S. PATENT DOCUMENTS 5,959,815  9/1999  Gilbert ........................................ 361/1

*Primary Examiner*—Michael J. Sherry
*Attorney, Agent, or Firm*—William H. Bollom

[57] ABSTRACT

Apparatus and processes to automatically power-down a computer system upon determination of the presence, imminence, or forecast of severe weather in the local area. A computer system receives data relating to a weather forecast for a particular local area from a weather service communication server and, based on a determination of the presence, imminence or forecast of severe weather in the local area, initiates an automatic power-down sequence. A delay may be provided to allow the user time to abort the initiation of the automatic power-down sequence. The data may be transmitted in any suitable manner, e.g., over a telephone line through the PSTN, using the Internet, using a paging system, etc. The weather service communication server is provided with the particular local area relating to the computer system. For instance, in the case of a dial-up telephone call to the weather service communication server, call related information such as the telephone exchange number and/or the area code in Caller ID information can be used by the weather service communication server to determine the local area relating to the particular computer system. Thus, a user is provided additional security against damage which may be caused to all or a portion of a computer system due to lightning strikes, downed telephone poles, etc. as a result of severe weather in a local area.

26 Claims, 4 Drawing Sheets

STORM ALERT AUTOMATIC SYSTEM POWER-DOWN

BACKGROUND OF THE INVENTION

1. Field of the Invention

This invention relates generally to a computer system connected to a telephone company central office of a public switched telephone network. More particularly, it relates to a computer system capable of accessing local weather service forecasts through the public switched telephone network to determine the necessity or desirability to automatically power-down the computer system before and/or during severe weather.

2. Background of Related Art

It is well known that many computer users leave their computer systems running at all times, for example, to receive e-mail, to receive facsimiles, to answer voice telephone calls, etc., even when the computer user is absent from the computer system. Furthermore, it is well known that lightening strikes in the area of a computer system can send a powerful electrical surge through the power cord of the computer system and damage or destroy many of the computer system's components, including data stored on a hard disk drive.

While surge protectors between the electrical outlet and the computer system offer some protection, it is known that many of the surge protectors on the market today do not protect entirely against the more powerful electrical surges, e.g., caused by nearby lightning strikes.

An alternative to the use of a surge protector is to simply turn off your computer when it is not in use. However, an unpowered computer is unable to perform many common and necessary functions, e.g., receiving e-mail, facsimiles, and/or voice messages. Thus, such essential computers are often left powered, even during times of severe weather.

When the user is away from the computer, e.g., out of town for personal or business reasons, they are not able to protect the computer adequately from the dangers of impending severe weather by turning the computer off.

FIG. 3 illustrates a conventional computer system 11 connected to a telephone company central office 15 of a public switched telephone network through a telephone line 13. A modem 17 in the computer system 11 is connected to the telephone line 13 to communicate with the telephone company central office 15 as required by telephone company standards.

A processor 19 within the computer system 11 is connected to the modem 17. A keyboard 21 may be used to input data and information into the processor 19 of the computer system 11, and a display 23 may be used to display information generated by the processor 19 of the computer system 11.

A hard disk drive 400 is also in communication with the processor 19. The hard disk drive 400 may store important information such as the operating system of the computer system 11, not to mention the day-to-day information such as received e-mail messages, facsimiles, and/or voice messages.

Unfortunately, particularly .during times of severe weather, the integrity of the computer system 11 may be at risk. This is particularly true with respect to information stored on the hard disk drive 400, which may or may not be easily replaced.

Accordingly, there is a need for a computer system having added protection from the dangers of impending severe weather, particularly when the user is away from the computer system.

SUMMARY OF THE INVENTION

In accordance with the principles of the present invention, a system comprises a processor, and a storm alert determination module adapted to initiate a power-down sequence in the processor upon determination of at least one of a presence, imminence, and forecast of severe weather condition in a local area.

A method for automatically powering-down a system upon receipt of a storm alert from a weather service in accordance with another aspect of the present invention comprises receiving a weather forecast, and determining whether the weather forecast relates to severe weather in an area local to the system. A power-down sequence is automatically initiated in the system if the weather forecast indicates the severe weather is at least one of present, imminent, and forecast for the local area.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a computer system and method for accessing local weather service forecasts through the public switched telephone network to automatically power-down the computer system during a local area storm alert or upon forecast of a local area storm. Furthermore, the present invention allows a computer system to automatically power-down on its own when a local area storm alert or storm warning has been issued by the weather service or a local area storm is forecast by the weather service.

In particular, in accordance with the principles of the present invention, a computer system periodically connects to a suitable terminal providing requested information to the computer system relating to a weather service to determine whether a storm alert or warning has been issued for a local area or whether a storm is forecast in the local area. The local area is one in which the computer system is installed. If the computer system determines that a storm alert or warning has been issued for the local area, or that an impending storm is forecast for the local area, the computer system is adapted to automatically power-down without further user intervention, either immediately, at a scheduled time, or upon expiration of a predetermined preset time period. This decision can be based, e.g., on the severity and/or imminence of the impending storm. For instance, the computer system may automatically power-down after 15 minutes if a user does not respond to a visual and/or audible prompt to the user of the computer system indicating that automatic power-down is about to occur.

Prior to power-down of the computer system, the computer system preferably saves data currently in the computer system to a hard disk drive system or a floppy disk drive system based on the needs of the particular software application(s) currently running on the computer system.

Figure 1:
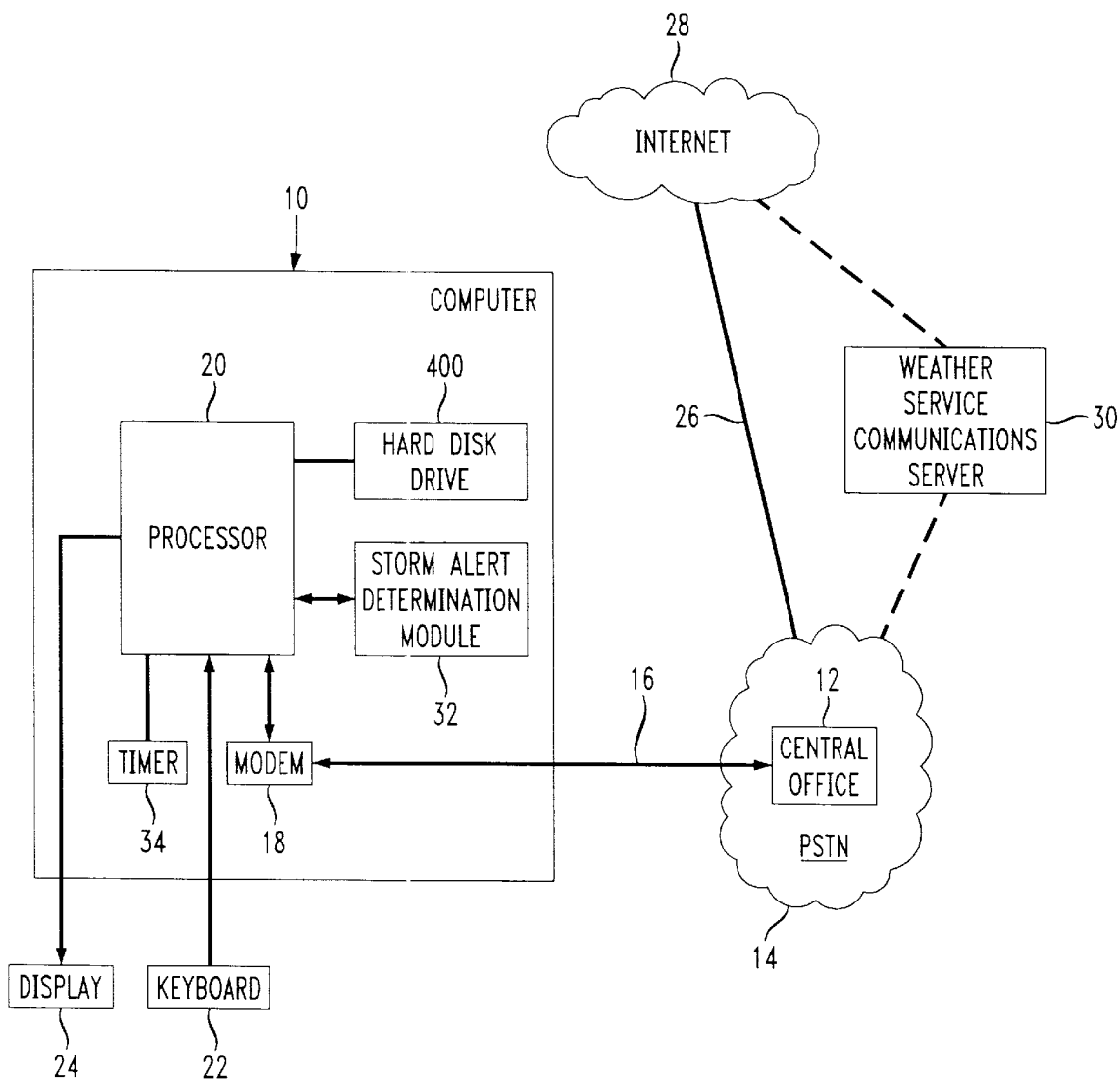
FIG. 1 illustrates a computer system having a storm alert determination module capable of accessing local weather information from a weather service communication server to determine the need to initiate a controlled power-down sequence based on severe weather in or near the local area, in accordance with the principles of the present invention.

FIG. 1 shows an example of a computer system 10 in automatic communication with a weather service communication server 30 to allow automatic power-down of a portion or all of the computer system 10 when severe weather is predicted, imminent, or currently occurring in the local area.

In particular, FIG. 1 illustrates a computer system, indicated generally at 10, capable of accessing local weather service forecasts provided by a weather service communication server 30 through the public switched telephone network (and/or through the Internet 28) to allow automatic power-down of the computer system 10 as desired, e.g., during a local storm alert, warning, or upon forecast of a local area storm.

The computer system 10 is interconnected to a telephone company central office 12 of a public switched telephone network 14 via a telephone line 16. A modem 18 in the computer system 10 is connected to the telephone line 16 to allow automatic communications with the weather service communication server 30 through the telephone company central office 12 as required.

Automatic communications can be established just once at a scheduled time, occasionally and/or periodically based on the needs of the user.

The computer system 10 may alternatively access local weather forecast information provided by the weather service communication server 30 through a web page on the Internet 28. This type of automatic communication can take place more frequently than using direct PSTN access to the weather service communication server 30 in some applications, particularly where a permanent Internet connection is available to the computer system 10.

A processor 20 within the computer system 10 is connected to the modem 18. The processor 20 may be any suitable processor, e.g., a microprocessor, a microcontroller, or a digital signal processor (DSP).

The computer system 10 may further include, e.g., a keyboard 22 for inputting data and information into the computer system 10, and/or a display 24 for displaying information generated by the processor 20 of the computer system 10.

In an embodiment of the present invention, as illustrated in FIG. 1, the public switched telephone network is connected to an Internet server via a second telephone line. As shown, the weather service communication server 30 can be connected to the PSTN 14 and/or to the Internet 28.

The weather service 30 provides local area weather forecasts, including local area storm alerts and/or warnings, to the computer system 10 via its modem 18 through the Internet 28 and/or the PSTN 14.

Importantly, the computer system 10 illustrated in FIG. 1 further includes a storm alert determination module 32 interconnected to the processor 20 of the computer system 10. The storm alert determination module in the disclosed embodiment is a software module included within the program code of the processor 20 of the computer system 10, but may alternatively be hardware-based circuitry nevertheless in communication with the processor 20. Of course, the storm alert determination module 32 can be implemented separate from the processor 20, but regardless, will preferably be in communication with the processor 20 of the computer system 10.

Preferably, the storm alert determination module 32 is activated upon power-up of the computer system 10, but may be activated and/or deactivated by the user as desired, e.g., just before the user goes away for an extended trip.

Preferably, the storm alert determination module 32 occasionally and/or periodically polls (i.e., requests) and receives a local area weather forecast from the weather service communication server 30. The storm alert determination module 32 may additionally or alternatively receive a local area weather forecast only upon manual activation of the storm alert determination module 30 by the user.

The principles of the present invention also relate to a broadcast weather forecast which is not necessarily requested but is nevertheless received by the computer system 10, e.g., by e-mail, by answering an incoming telephone call initiated by the weather service communication server 30, etc. For instance, the user of the computer system 10 may pre-arrange with the local weather service to receive power-down messages either by e-mail, by AM radio, by TV channel, by any RF wireless communication, or by dial-up telephone call to the computer system when a local storm is forecast, imminent, and/or occurring in the particular local area. Another way to receive power-down messages is to use a local weather forecast device which predicts oncoming or existing severe weather, and to interface the same to the computer system 10 in an appropriate manner, e.g., through a serial interface.

The protocol and data formatting used between the computer system 10 and the communication from the weather service communication server 30 may be any appropriate protocol and format.

When activated, the storm alert determination module 32 of the computer system 10 may auto-dial a pre-arranged access telephone number (or web page address) of the weather service communication server 30 when scheduled or requested by the user. Preferably, the computer system 10 provides the weather service communication server 30 with suitable information necessary to determine a local area of the computer system 10. For instance, the local area may be defined using an area code of the telephone line 16, or using the postal zip code relevant to the user of the computer system 10.

Preferably, the weather service communication server 30 will include a service from the telephone company to provide it with call related information with respect to incoming telephone calls. Thus, the local area of the caller can be determined with, e.g., the area code and/or exchange number of the incoming call to the weather service communication server 30 without the need to pass any information from the computer system 10 to the weather service communication server 30.

The storm alert determination module 32 determines whether severe weather is forecast, imminent, or currently occurring in the relevant local area. The user of the computer system 10 may customize the automatic power-down controlled by the storm alert determination module by enabling power-down based on the seriousness of the severe weather and/or its likeliness to actually occur. For instance, the user may enable automatic power-down upon a report of an actual storm currently occurring in the local area, but not for a mere forecast or warning of severe weather.

If the storm alert determination module 32 determines that a local area storm alert or warning has not been issued by the weather service 30, or that a forecast for a local area storm is not currently in effect, the storm alert determination module 32 will have no effect on the computer system 10, and thus the computer system 10 will continue to remain powered-up and operate in an otherwise conventional fashion. However, if the storm alert determination module 32 determines that a local area storm alert or warning has been issued by the weather service 30, or that a local area storm is currently forecasted for the local area, the storm alert determination module 32 will instruct the processor 20 to terminate all applications currently running on the computer system 10 in preparation for power-down, and will then instruct the processor 20 to power-down the computer system 10 at an appropriate time, e.g., in fifteen (15) minutes. The delay after determination by the storm alert determination module 32 may be variable, e.g., based on the severity of the weather.

As illustrated in FIG. 1, the computer system 10 may further include a timer 34 adapted to time an amount of time between the determination by the storm alert determination module 32 that power-down is necessary or desired, and initiation of the automatic power-down sequence of events by the computer system 10. In the disclosed embodiment, the user can program the timer 34 through the keyboard 22 or other input device via the processor 20 to preset a predetermined amount of time, i.e., fifteen (15) minutes, between the determination by the storm alert determination module 32 of, e.g., a local area storm alert, warning or forecast from the weather service and the automatic power-down of the computer system 10. During the delay, e.g., fifteen (15) minute delay, the user may be given the opportunity to cancel the impending automatic power-down sequence as desired, e.g., if they are in fact not out-of-town and are at the computer system 10.

Thus, upon the determination by the storm alert determination module 32 of the need for an impending power-down sequence, the computer system 10 may provide the user with an opportunity to abort the power-down. If no input (e.g., abort request) is received from the computer user during the delay, the computer system 10 will automatically initiate a controlled power-down. The computer system 10 may re-check the weather forecast at the end of the delay to ensure that the severe weather conditions continue to pursue.

All or only a portion of the computer system 10 may be subject to the automatic power-down caused by the storm alert determination module 32. For instance, separately powered devices may be controlled separately, and only some of those devices (e.g., devices at highest risk during severe weather such as a modem and/or a hard disk drive) may be automatically powered down during a storm with the remainder of the computer system 10 remaining powered even through the storm. In such a case, the computer system 10 may automatically power-up those devices automatically powered-down after a suitable period of time, e.g., one (1) hour, or based on the severity of the weather forecast. The power-up delay may be based on the forecast severity of the storm. Then, once re-powered, the computer system 10 may again begin its cycle to determine whether or not another automatic power-down is necessary by again receiving information from the weather service communication server 30.

Figure 2:
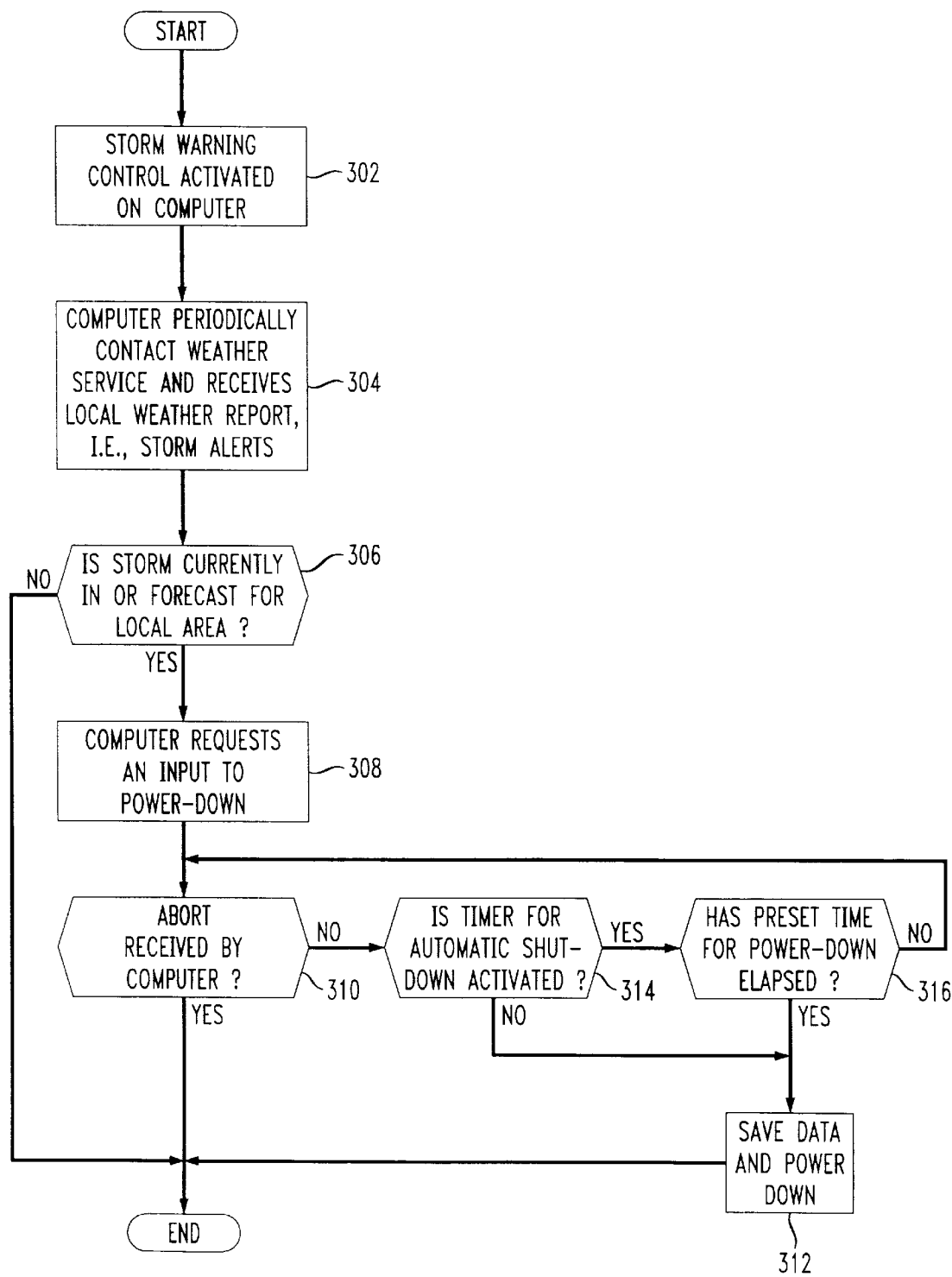
FIG. 2 is a flow chart illustrating the process by which the computer system of FIG. 1 automatically initiates a power-down sequence in a relevant computer system based on current or predicted severe weather, in accordance with the principles of the present invention.
Figure 3:
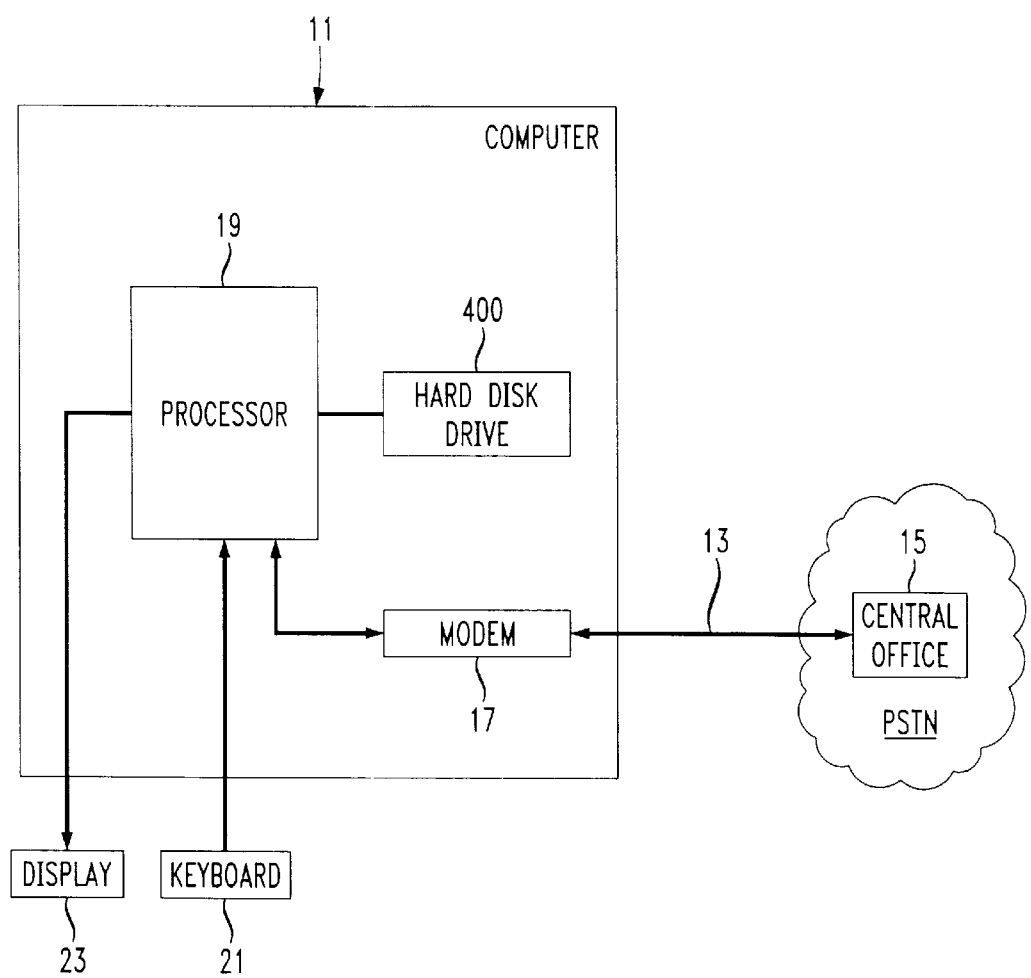
FIG. 3 illustrates a conventional computer system having a modem connected to a public switched telephone network through a telephone line.

FIG. 2 illustrates a flow chart showing an exemplary process by which the computer system 10 of FIG. 1, upon receipt of a local area storm alert, warning or a local area storm forecast, may be automatically powered-down.

With reference to FIG. 2, in step 302, the computer user activates the storm warning determination module 32 within the computer system 10. As discussed, this activation may be automatic at power-up of the computer system 10, or may be upon manual activation by the user.

In step 304, after activation of the storm warning determination module 32, the computer system 10 will periodically or occasionally contact the weather service communication server 30 (e.g., through the public switched telephone network, Internet, paging system, etc.) and receive information sufficient to determine the presence, imminence or forecast of severe weather.

In decision step 306, the storm alert determination module 32 determines based on the information received from the weather service communication server 30 whether or not a local area storm alert, warning or forecast has been issued for the relevant local area. If not, the process shown in FIG. 2 will end and thus the computer system 10 will remain powered-up and operate in an otherwise normal fashion.

On the other hand, if a local area storm alert, warning or forecast has been determined in step 306, the computer system 10 may provide the user with the opportunity to abort an imminent power-down sequence, as shown in step 308.

In decision step 310, it is determined whether or not the user has aborted the automatic power-down sequence. If the user aborts the automatic power-down sequence in step 310, the process ends and the computer system 10 remains powered. On the other hand, if the user fails to abort the automatic power-down sequence, the process proceeds to step 314.

In step 314, it is determined whether the timer 34 for automatic power-down has been activated. If the timer 34 for automatic power-down has not been activated, the automatic power-down sequence will terminate and the computer system 10 will save data and power-down as shown in step 312. However, if the timer 34 for automatic power-down has been activated, in decision step 316, it is determined whether the preset predetermined time period for power-down has expired or elapsed. If not, the computer system 10 remains powered-up and operating as normal until the preset predetermined time period for power-down has expired or elapsed. This creates a delay suitable to allow the user time to abort the automatic power-down sequence if so desired. Once the preset predetermined time period for automatic power-down has expired or otherwise elapsed (e.g., after five (5) minutes), the computer system 10 will complete its power-down sequence and power-down.

Thus, the present invention provides added protection against damage or destruction of many of the computer system's 10 components including data stored on the hard disk drive 400 regardless of whether the computer system 10 is connected to a surge protector, which may not be sufficient in the case of severe local weather. Thus, a computer system 10 can be left powered-on during extended absences without fear of increased vulnerability to severe weather.

It should be noted that the present invention has been described heretofore as being used with computer systems 10. However, the principles of the present invention relate equally to other computerized systems, e.g., including, but not limited to, televisions 40, video cassette recorders, DVD's, web TVs, entertainment audio devices 50, telephones, etc. which have the capability to receive local weather information.

Figure 4:
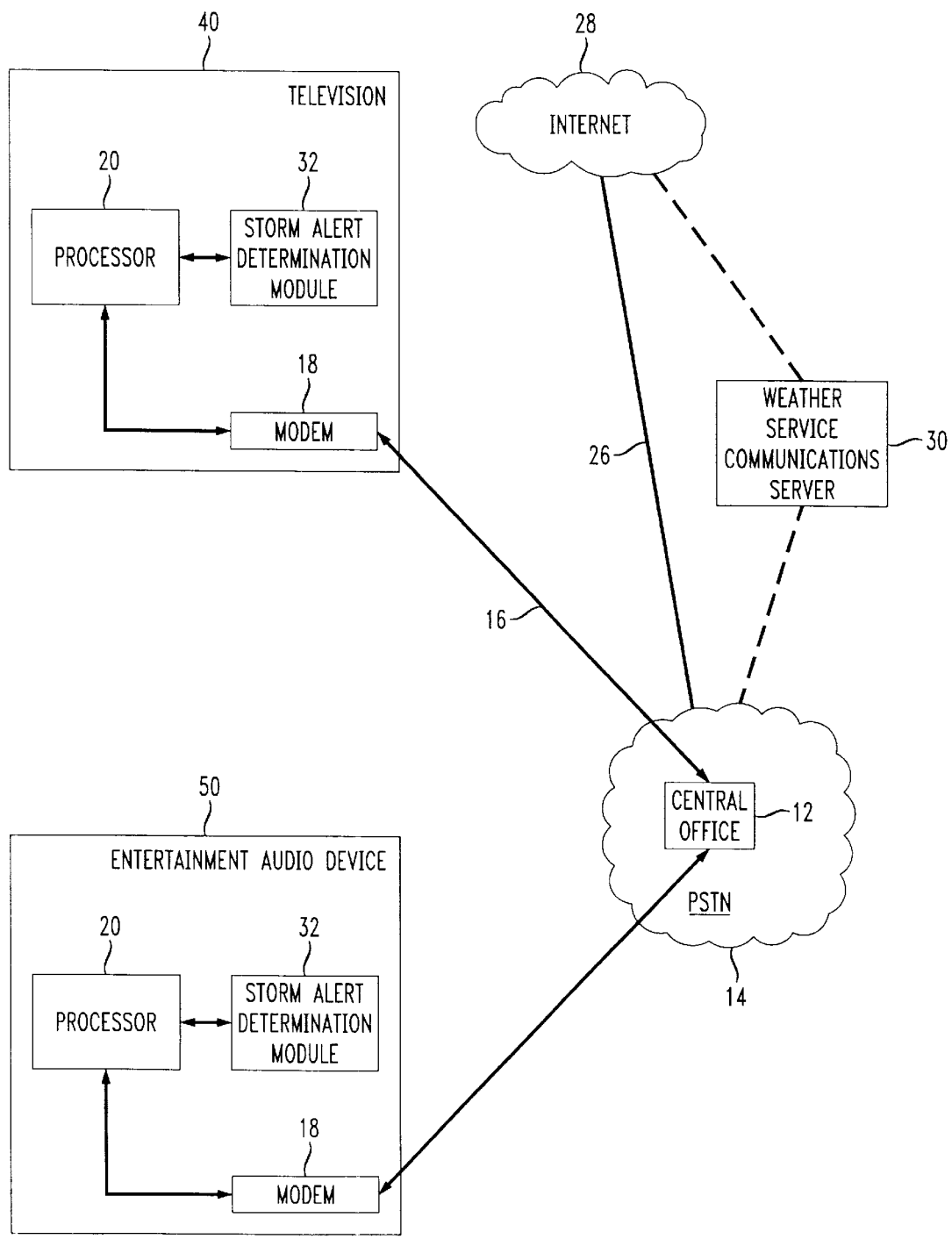
FIG. 4 shows television and entertainment audio devices includes storm alert determination modules in accordance with the principles of the present invention.

FIG. 4 shows television and entertainment audio devices including storm alert determination modules in accordance with the principles of the present invention.

While the invention has been described with reference to the exemplary embodiments thereof, those skilled in the art will be able to make various modifications to the described embodiments of the invention without departing from the true spirit and scope of the invention.

What is claimed is:

1. A system, comprising:

a processor;

a storm alert determination module adapted to initiate a power-down sequence in said processor upon determination of at least one of a presence, imminence, and forecast of severe weather condition in a local area; and a connection between said storm alert determination module and a weather service communication server that allows said storm alert determination module to receive weather information relating to said local area.

2. The system according to claim 1, wherein:

said connection between said storm alert determination module and said weather service communication server is a modem adapted to automatically communicate with a weather service communication server to receive weather information relating to said local area.

3. The system according to claim 2, wherein:

said modem is adapted to communicate with said weather service communication server via an Internet.

4. The system according to claim 1, wherein:

said connection between said storm alert determination module and said weather service communication server is an Internet connection that allows said module to receive weather information relating to said local area.

5. The system according to claim 1, further comprising:

a timer adapted to provide a delay in initiating said power-down sequence to allow a user time to abort said initiation of said power-down sequence.

6. The system according to claim 5, wherein:

said timer is programmable by said user to preset said delay.

7. The system according to claim 1, wherein:

said power-down sequence is a controlled power-down sequence allowing said processor to save appropriate data before powering down said system.

8. The system according to claim 1, wherein:

said system is a computer system.

9. The system according to claim 1, wherein:

said system is a television.

10. The system according to claim 1, wherein:

said system is an entertainment audio device.

11. The system according to claim 1, further comprising:

a non-volatile timer adapted to initiate a power-up sequence a predetermined amount of time after said initiation of said power-down sequence.

12. The system according to claim 2, wherein:

said communication includes e-mail.

13. A method for automatically powering-down a system upon receipt of a storm alert from a weather service, comprising:

receiving a weather forecast;

determining whether said weather forecast relates to severe weather in an area local to said system; and automatically initiating a power-down sequence in said system if said weather forecast indicates said severe weather is at least one of present, imminent, and forecast for said local area.

14. The method for automatically powering-down a system upon receipt of a storm alert from a weather service according to claim 13, wherein:

said power-down sequence relates to a power-down of only a portion of said system.

15. The method for automatically powering-down a computer system upon receipt of a storm alert from a weather service according to claim 13, further comprising:

activating said system to receive said weather forecast.

16. The method for automatically powering-down a computer system upon receipt of a storm alert from a weather service according to claim 13, wherein:

said weather forecast is adapted to be received via a public switched telephone network.

17. The method for automatically powering-down a computer system upon receipt of a storm alert from a weather service according to claim 13, wherein:

said weather forecast is adapted to be received via a connection over an Internet.

18. The method for automatically powering-down a computer system upon receipt of a storm alert from a weather service according to claim 13, further comprising:

providing a delay before said automatic initiation of said power-down sequence to allow a user time to abort said power-down if desired.

19. The method for automatically powering-down a computer system upon receipt of a storm alert from a weather service according to claim 13, wherein:

said weather forecast is received via e-mail.

20. The method for automatically powering-down a computer system upon receipt of a storm alert from a weather service according to claim 13, further comprising:

automatically initiating a power-up sequence in said system a predetermined amount of time after said initiation of said power-down sequence.

21. Apparatus for automatically powering-down a system upon receipt of a storm alert from a weather service, comprising:

means for receiving a weather forecast;

means for determining whether said weather forecast relates to severe weather in an area local to said system; and means for automatically initiating a power-down sequence in said system if said weather forecast indicates said severe weather is at least one of present, imminent, and forecast for said local area.

22. The apparatus for automatically powering-down a system upon receipt of a storm alert from a weather service according to claim 21, wherein:

said power-down sequence relates to a power-down of only a portion of said system.

23. The apparatus for automatically powering-down a computer system upon receipt of a storm alert from a weather service according to claim 21, further comprising:

means for activating said system to receive said weather forecast.

24. The apparatus for automatically powering-down a computer system upon receipt of a storm alert from a weather service according to claim 21, wherein:

said weather forecast is received via a public switched telephone network.

25. The apparatus for automatically powering-down a computer system upon receipt of a storm alert from a weather service according to claim 21, wherein:

said weather forecast is received via a connection over an Internet.

26. The apparatus for automatically powering-down a computer system upon receipt of a storm alert from a weather service according to claim 21, further comprising:

means for providing a delay before said automatic initiation of said power-down sequence to allow a user time to abort said power-down if desired.

* * * * *